March 30, 1954
S. REZA-BEK ET AL
2,673,734
FILM WINDING DEVICE
Filed April 17, 1951
3 Sheets-Sheet 1
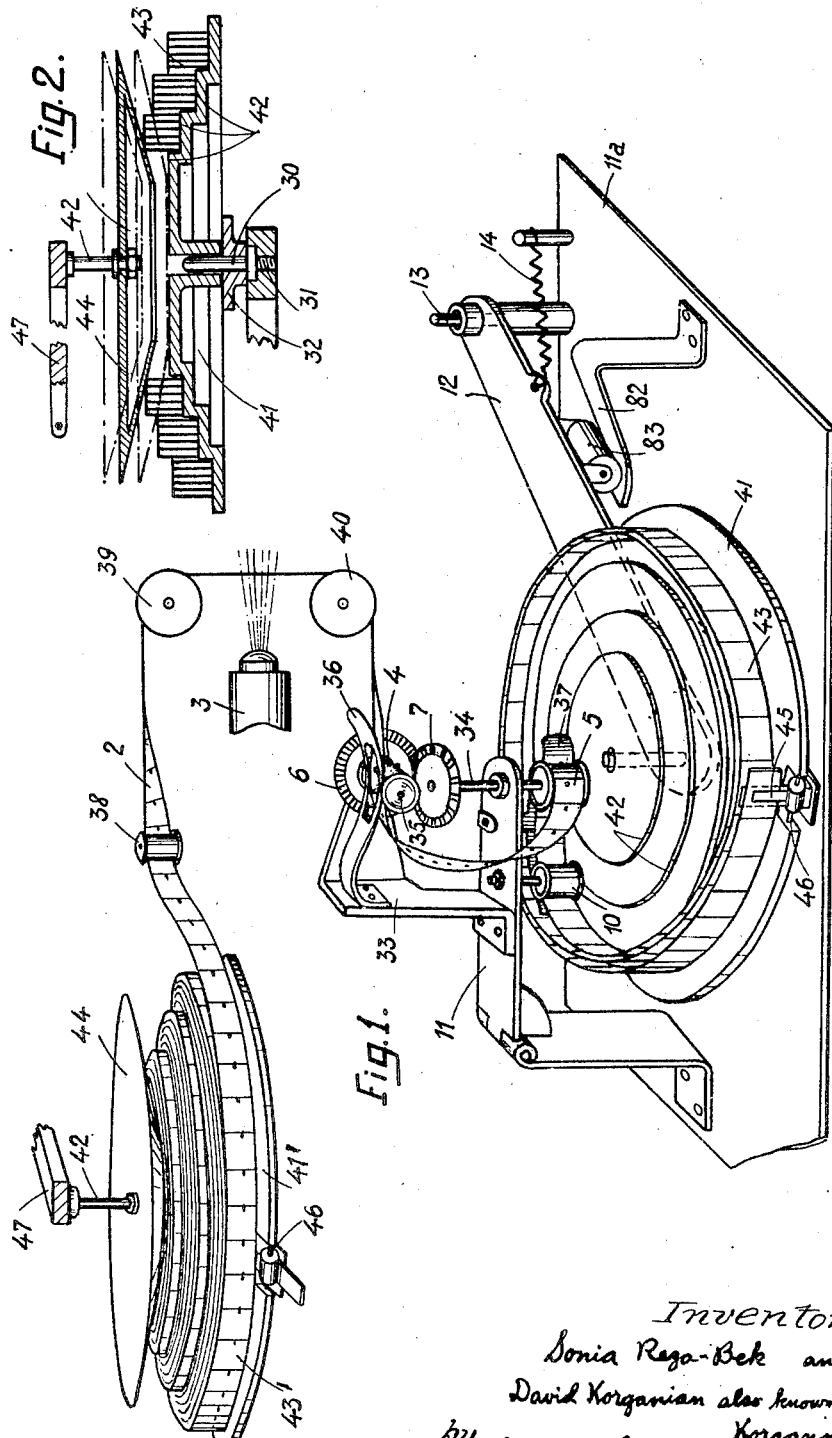
Inventors:
Sonia Reza-Bek and
David Korganian also known as
Korganoff
by Brown + Seward
Attorneys March 30, 1954　　　S. REZA-BEK ET AL　　　2,673,734
FILM WINDING DEVICE
Filed April 17, 1951　　　3 Sheets-Sheet 2
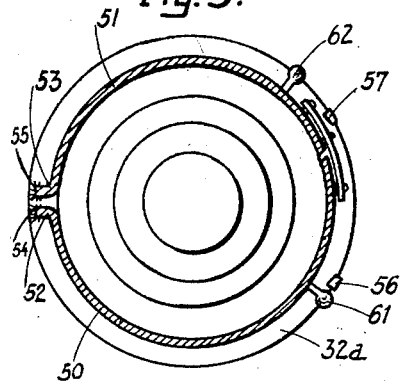
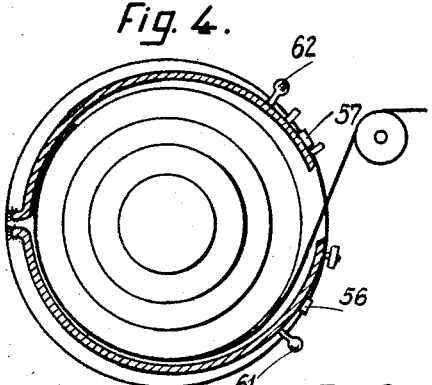
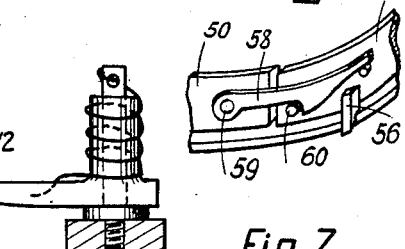
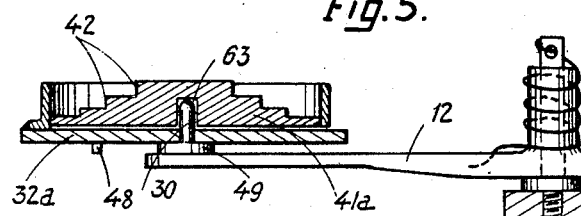
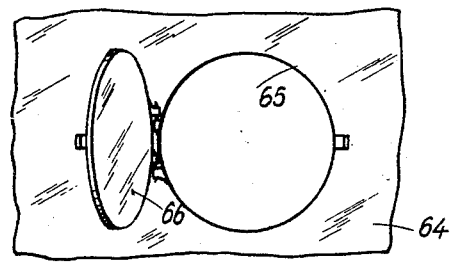
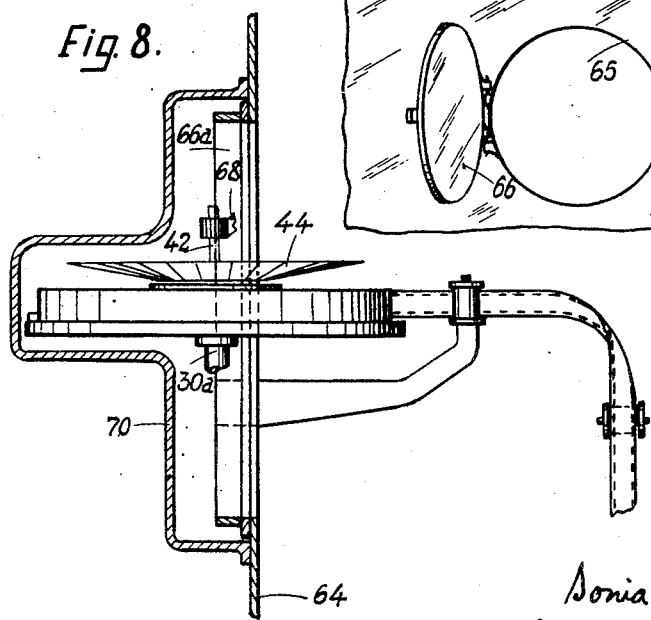
Inventors:
Sonia Reza-Bek and
David Korganian also known as
Korganoff
by Brown & Seward
Attorneys

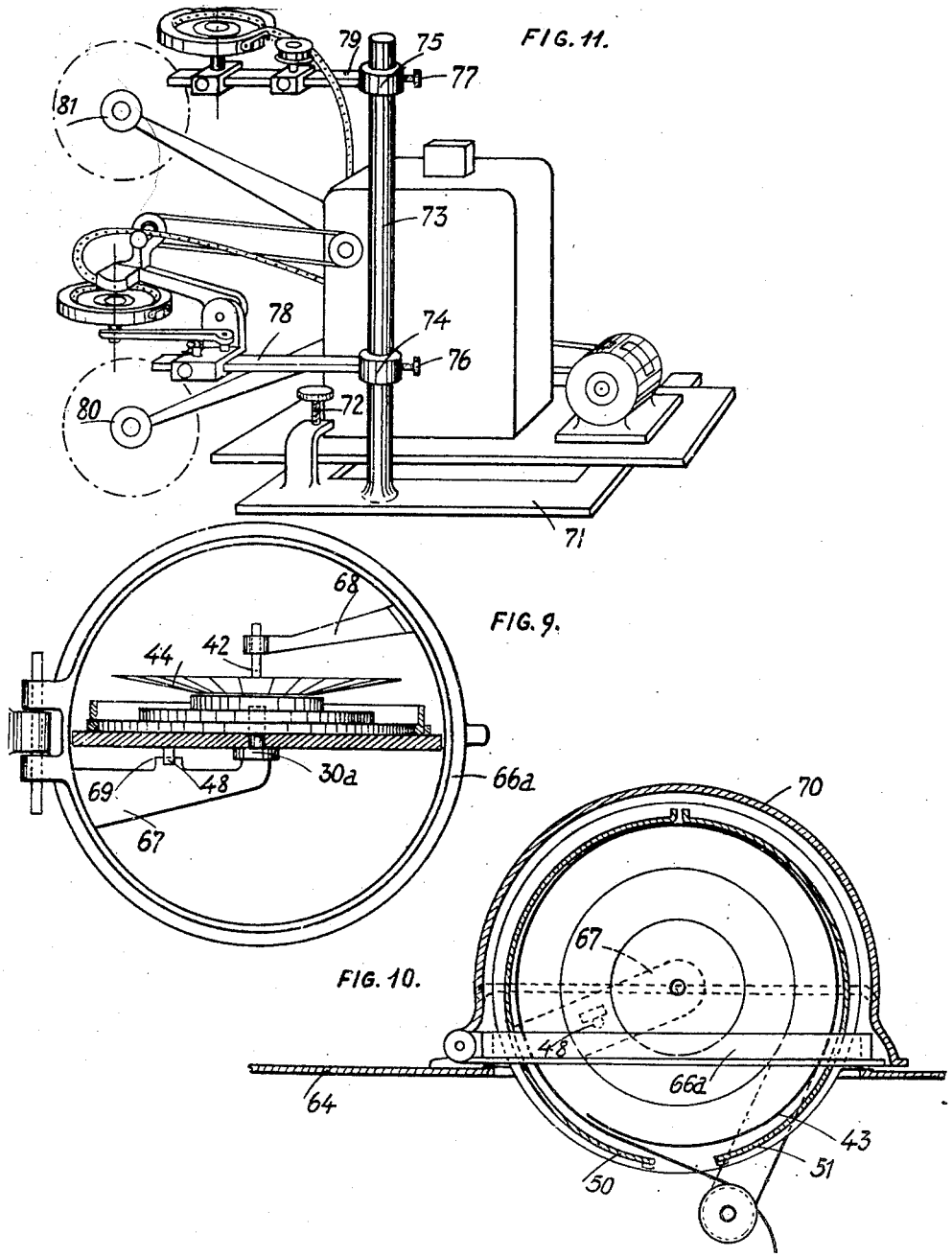

Patented Mar. 30, 1954

2,673,734

UNITED STATES PATENT OFFICE 2,673,734

FILM WINDING DEVICE

Sonia Reza-Bek and David Korganian, also known as David Korganoff, Paris, France Application April 17, 1951, Serial No. 221,432

Claims priority, application France February 9, 1951

5 Claims. (Cl. 271—2.19)

This invention relates to novel improvements in devices for winding tapes having a certain amount of rigidness, and more particularly, in film winding devices.

In the motion picture art, it is customary to wind a film from a feed reel onto a take-up reel, during projection, and then to re-wind the film from the take-up reel back onto the feed reel in order to bring the head end of the film in position for another projection. This step of re-winding the film is inconvenient and requires considerable time and labor.

It has been already proposed, for eliminating this step of rewinding the film, to wind the film directly from the feed reel of the projecting apparatus onto a take-up reel in such a manner that the head end of the film is disposed on the outermost winding turn of the film roll in position to be fed directly therefrom, e. g. through a projection apparatus.

This mode of winding, however, usually requires synchronizing mechanisms since the take-up reel, though the film is fed thereto with a constant linear speed, rotates at a continuously varying speed, due to the progressive increase of the radial thickness of the roll.

An object of our invention is to provide a film winding device in which the film is fed in a well defined direction onto a freely rotated support which is adapted to have its axis describing, against the action of elastic means, an arcuate stroke around a fixed axis parallel to the axis of said support as the rolling operation proceeds, so that the spiral along which the film is to be wound is continuously maintained tangent with the feed direction of the film, abutment means being provided on the periphery of said support to receive at least the leading end of the outermost winding turn of the roll while making the same fast with said support.

This arrangement permits omitting a synchronizing device since the rotation of the support is determined by the feeding of the film itself. This rotation, in combination with said angular displacement of the support axis, permits rolling the film, while the action of said elastic means ensures a tight winding thereof.

However, if the film roll thus obtained is to be removed from said support to be mounted later on the feed reel, this gives rise to certain difficulties of manipulation, in particular with small (8 mm. or 16 mm) films, due to the absence of any rigid member capable of supporting the film during this operation.

Another object of the invention is to provide a film winding device of the type described, in which the film is wound with its leading end outermost on a rigid support capable of constituting the core and one flange of a rigid reel, said support and the film roll wound thereon being removable as a whole assembly to be directly substituted for a similar core and flange assembly constituting a removable portion of the feed reel when the film is to be projected again.

A further object of the invention is to provide a film winding device of the type described, in which said support offers a series of circular concentric steps superimposed to each other from the periphery to the axis of said support and constituting both a stepped core and one flange of a reel body.

Thus, the film is first wound on the outermost step until the next superimposed step is reached when the film climbs on this latter step, this first film package being thus clamped between its outermost turn held by the above mentioned abutment means and the shouldering between the first and second said steps. The second film package is then rolled and clamped between the innermost turns of the first package and the second shouldering between the second and third step and so on. There is thus obtained in the same time a rigid core on which the film is effectively wound though this winding takes place from the periphery towards the axis of said core and a flange offering to the film roll a support parallel to its stepped winding planes. When the roll is completely wound, it thus offers the shape of a plurality of co-axial cylinders of different diameters. The tightening of the film turns is perfectly ensured, which avoids, particularly during the subsequent projection of the film, any unwanted release of the turns.

Further to the above main objects, the invention also consists in a number of novel and improved constructive embodiments as exposed hereunder and as claimed in the appended claims.

In one embodiment, the above mentioned support is removably mounted, at the winding station, on a pivot provided at the end of a pivotally mounted arm urged in one rotation direction by elastic means and adapted to hold the above mentioned spiral tangent to the feeding direction of the film, said feeding being ensured by a suitable mechanism fed in turn from, e. g. the projection apparatus and driven by any suitable means such as an electric motor. In this case the outer periphery of the said support carries a simple spring-clip articulated on the support and adapted to be brought, for winding, in a position right-angled to the plane of said support, the leading end of the film being first engaged into said clip, whereupon a few turns are made manually, said turns constituting an outer wall against which the next inner turns will be tightly wound.

This embodiment has the complementary advantage of securing the outer leading end of the film which is tightly wound on its support, so that any risk of sudden unwinding of the roll during a manipulation thereof is avoided.

For unwinding, it suffices to release from the aforesaid clip the leading end of the film, bringing said clip into the horizontal plane and engaging said leading end in the driving device of the projecting apparatus.

According to another feature of the invention, there is provided, at the feeding station, a device comprising a pivot adapted to receive the assembly constituted by the above mentioned support and a roll of film wound thereon and further comprising a disk having a slightly conical shape pivoted about an axis supported by a hinged arm so designed that, when said conical disk is lowered on the above mentioned assembly, said disk and said assembly are made co-axial with one another while said disk is pressed upon the inner turns of the film roll by gravity.

The aforesaid disk thus constitutes a second removable flange capable of completing the core and flange of any reel assembly obtained at the winding station of the device according to the invention, said second flange holding, during the feeding of the film, the inner turns thereof tightly wound.

In another embodiment, there is provided for each reel comprising a support and a film roll wound thereon an individual and removable cylindrical dish-like box adapted to ensure the subsequent protection of the stored film.

This last arrangement permits avoiding even the simple manipulation consisting in putting the film roll into a box, since said roll is directly wound on its support and in its box.

According to another feature of the invention, each one of said boxes is adapted to be directly mounted with the film roll contained therein on the pivot at the feeding station, which permits avoiding even the simple manipulation consisting in removing the film roll from a box.

In this embodiment, the unwinding of the film takes place through a slot which is opened in the reel cylindrical wall before unwinding, this operation releasing at the same time the above mentioned support which is thence capable of freely rotating on the pivot at the feeding station, means being moreover provided to hold the box stationary so that the aforesaid slot remains in a fixed angular position.

In a particular constructive embodiment, the cylindrical wall of the dish-like box is constituted by two semi-circular leaf-springs urged from one another, said springs being secured near each other by one outwardly folded end on a plate constituting the bottom of the dish-like box and carrying on its lower face a pin adapted to cooperate with a suitable abutment provided at the feeding station to hold the box stationary as the film is paid out, the support being so designed as to be capable of freely rotating on the pivot of the box without being in contact with the bottom of the same, both at the winding and feeding stations, the free ends of the springs being held together during the winding operation by locking means so that they clamp between them the cylindrical wall of the support thus making the same rotatively fast with the bottom of the box, while, for unwinding, the unlocking of said means releases the spring ends which are then urged from one another, thus offering a passage for the film to be paid out while leaving the support free to rotate on its pivot.

Another object of the invention is to provide means to adapt the above described device to any usual type of film projector.

Other objects and advantages of the invention will be more easily understood with reference to the appended drawings in which some embodiments thereof have been shown as a mere illustration.

In these drawings:

Fig. 1 is a perspective view of a film winding device according to the invention.

Fig. 2 is an axial section of a film reel obtained by means of said device.

Figs. 3 to 6 show another embodiment of the reel body.

Figs. 7 to 10 show the adaptation of the device according to the invention to a projector for standard (e. g. 35 mm.) films.

Fig. 11 shows the adaptation of a device according to the invention to a projector for small films.

Referring first to Fig. 1, an arm 12 is articulated on a rod 13 supported on a base 11a so as to be capable of describing around said rod 13 an arcuate stroke in a plane parallel to said base; a spring 14 urges arm 12 in one direction. A pivot 30 is screwed at 31 on the free end of arm 12. Two orthogonal shafts 34 and 35 are mounted on a bracket 11 and a support 33 carried thereby, each one of said shafts carrying a bevel pinion 6 and 7, respectively, said pinions being rotatively fast on their respective shafts. Each shaft 34, 35 further carries a sprocket 5 and 4, respectively, also rotatively fast and driving a film 2. Curved leaf-springs 36 and 37 suitably apertured hold film 2 elastically in mesh with the teeth of sprockets 4 and 5. Film 2 is guided onto sprocket 4 through a series of guiding rollers 38, 39, 40 suitably located so that the film, before reaching sprocket 4, may be guided through a projector 3 (indicated diagrammatically). Sprockets 4 and 5 are both driven at the same speed from a suitable motor, e. g. an electrical motor (not shown). After leaving sprocket 5, the film runs on a loose roller 19 which is supported on an axis mounted on bracket 11, the film being held in engagement with sprocket 5 and guided past the roller 10 by the curved leaf-spring 37 which guides it tangentially against the inwardly growing roll.

In the example shown in Figs. 1 and 2, the roll is wound on a support 41 which offers a series of steps 42 and which is freely rotatable on pivot 30 through a washer 32. The variation of level of support 41 required to determine stepped winding planes is ensured by a sloping surface 82 on which rests a roller 83 carried on arm 12. Steps 42 divide roll 43 into several packs, each bearing by its innermost turn on a circular shouldering, which serves to prevent any unwanted sudden release of the film roll.

In this embodiment, the leading outer end of the film is secured on the periphery of support 41 by means of a spring-clip 45 constituted by two spring-leaves between which the film is to be engaged, said clip 45 being articulated about an axis 46 so that it may be erected at right angle to the plane of the support.

The leading end of the film being thus secured, a few turns should be manually formed around the outermost step of the support whereupon said turns act as an outer wall against which the film is wound tangentially and from inside.

When the film is completely wound, it suffices to remove assembly 41—43 and to mount the same, at the feeding station, as indicated at 41', 43'. This assembly is then completed by a conical disk 44 freely rotatable on a pivot 42 secured at the end of an arm 47 which is so hinged that, in the position shown in Figs. 1 and 2, axes 42 and 30 of both real portions are aligned while the conical surface of disk 44 exerts by gravity on the last inner turns of roll 33 a pressure sufficient to maintain said turns as the film is payed out.

It is to be understood that the film shown at 2 is not necessarily fed from the assembly 41'—43' shown in Fig. 1 and that it is also possible to wind in the shape of the assembly 41—43 any film 2, e. g. from a conventional reel which may be mounted either at the same feeding station as reel 43' or, e. g. around a horizontal axis at the conventional feeding station provided on the projection apparatus (see, for example, Fig. 11).

In the embodiment shown in Figs. 3 to 6, a plate 32a is removably mounted on a pivot 30 either at the winding or feeding station. An abutment 48 provided for this purpose on the lower face of plate 32a rests, at the feeding station, on an abutment not shown, so as to hold plate 32a stationary while, at the winding station, as shown in Fig. 5, there is interposed on pivot 30, between arm 12 and plate 32a, a washer 49 which is at least slightly thicker than pin 48, so that plate 32a is capable of rotating freely. Plate 32a constitutes the bottom of a dish-like member the cylindrical wall of which is constituted by two semi-circular leaf-springs 50, 51 secured at one end 52, 53, respectively, which end is folded outwardly, at two adjacent points near the periphery of plate 32a, as shown at 54 and 55, respectively, the original tension of springs 50, 51 being such that the same are normally urged away from one another toward the position shown in Fig. 4 at which they are stopped by abutments 56 and 57, respectively provided on the periphery of plate 32a. Spring 50 carries a hook 58 articulated at 59 and cooperating, as shown in Fig. 6, with a pin 60 provided on the other spring 51, so that when after having brought springs 50 and 51 together, which may be effected e. g. by means of two studs 61 and 62 respectively, pin 60 is engaged in hook 58, springs 50 and 51 are thence held in the position shown in Fig. 3 in which the periphery of a stepped support similar to that of the above described embodiment and shown at 41a is clamped by said springs. Thus, any film roll (not shown) wound on said step support is also clamped within said springs. The design of support 41a differs from support 41 in that instead of being provided with an axial bore, support 41a is only provided with a central hole 63 which only extends along a portion of its thickness, so that once the support is mounted on the pivot in said hole, said support not only rotates freely on said pivot, but furthermore it does not rest on plate 32a; its freedom of rotation thus cannot be impaired through a friction on said plate. In the winding position shown in Fig. 3, the clamping of the outer periphery of support 41a by springs 50 and 51 results in making said support rotatively fast with said plate while, in the position shown in Fig. 4, which corresponds to feeding, the assembly comprising the plate and springs is held stationary as described above by means of pin 48, support 41a then being free for rotating on its pivot. The film is payed out through the slot formed between the free ends of springs 50 and 51 when the same are spaced from each other.

Figs. 7 to 10 show an illustrative manner of adapting a device according to the invention to a projector for standard films. It is known that in such an apparatus, the film reels are protected both at the feeding and winding stations by means of metal sheets, as shown at 64 (Fig. 7) in which is cut a circular opening 65 closed by a hinged cover 66.

To adapt the device according to the invention to each station, it suffices to substitute for cover 66 a ring 66a, this assembly being completed by two arms 67 and 68 mounted on ring 66a and one of which carries a pivot 30a, while the other one carries, at the feeding station, axis 42 and conical disk 44 described above. For feeding a film into a projector, it suffices to mount on pivot 30a e. g. the assembly described with reference to Figs. 3 to 6, the pin 48 of which is then held stationary by the abutment shown at 69. At the winding station, the disposition should be similar, the assembly 42—44 being however substituted by the feeding and guiding device described with reference to Fig. 1, the abutment 69 being moreover omitted. Thanks to the hinged articulation of ring 66a, it is easier to mount or remove the film reels. The whole assembly is protected by a hooding, as shown at 70, which may be in turn articulated on the same hinge as ring 66a. Finally, there is shown in Fig. 11 an illustrative manner of adapting a device according to the invention to a projector for small films.

There is provided for this purpose, according to another feature of the invention, an adaptor comprising a base 71 intended to be secured, e. g. by means of a screw 72, on the base of the projection apparatus and which carries a substantially vertical rod 73 along which are slidably mounted two sleeves 74, 75 to be located in any desired position along rod 73, e. g. by means of screws 76 and 77, each one of said sleeves carrying an arm 78 and 79, respectively right-angled with the rod and carrying in turn, the first one, the winding station and, the other one, the feeding station of the device according to the invention. At 80 and 81 are shown the normal winding and feeding stations of the projection apparatus; it will be easily understood that, if it is desired to project a film wound on a conventional reel, it suffices to mount the same in the usual feeding station 81 of the projector from which said film may be wound on a support and possibly in a box according to the invention, as described previously. After this first winding operation, each new projection of the film will take place from the feeding station according to the invention. Similarly, if, for any reason, it is desired to obtain from a reel according to the invention a reel wound in the conventional manner, i. e. with the leading end innermost, it will be sufficient to use the usual winding station of the projection apparatus.

It is to be understood that the invention is in no way limited to the embodiments described and shown. In particular, the number, height, radial size, etc. . . . of the support steps may vary within wide limits within the scope of the invention as claimed in the appended claims.

What is claimed is:

1. In a mechanism for winding a motion picture film with the leading end outermost, a horizontally disposed removable and freely rotatable disk member having its upper face formed with a plurality of concentric steps ascending toward the centre of said disk member, the horizontal parts of said steps forming a receiving support for the film and the vertical part of each step forming an inner core for the film portion supported by the preceding lower horizontal part, means for retaining said leading end at least against outward movement disposed adjacent the peripheral edge of said disk member whereby said film can be manually coiled with said end outward to form outer windings resting against said retaining means, and means for directing the film circumferentially into engagement with said outer windings to thereby rotate said disk member and to progressively form successive compact coil portions wound internally toward and upon said cores.

2. A mechanism according to claim 1 in which the retaining means is a clip pivotally mounted on the periphery of the disk and movable alternately into film-engaging position and into film-releasing and feeding position.

3. A mechanism according to claim 1 which includes a flat disk with which the stepped disk is coaxially and rotatably associated and in which the retaining means comprises at least one arcuate band mounted on the periphery of the flat disk and adapted to be alternately clamped against the periphery of the stepped disk to prevent relative rotation thereof and released to permit rotation of said stepped disk and free feeding of the film.

4. A mechanism according to claim 1, in which means are provided for maintaining a substantially constant relation between said horizontal portions of the upper disk face and said film directing means.

5. In a motion picture projector having a feed reel shaft and a receiving reel shaft, a reel comprising a disk arranged to be alternately and rotatably mounted upon said feed reel shaft and upon said receiving reel shaft, said disk having one face provided with concentric steps ascending toward the centre of the disk, and a holding device mounted adjacent the peripheral edge of said disk to retain the end of a film to be wound internally on said reel.

SONIA REZA-BEK.
DAVID KORGANIAN.
*Also known as David Korganoff.*

References Cited in the file of this patent

UNITED STATES PATENTS

| Number | Name | Date |
|---|---|---|
| 1,119,489 | Bingham | Dec. 1, 1914 |
| 1,134,664 | Bingham | Apr. 6, 1915 |
| 1,411,106 | Judd | Mar. 28, 1922 |
| 2,269,653 | Feller | Jan. 13, 1942 |
| 2,335,179 | Feller | Nov. 23, 1943 |
| 2,481,708 | Adams | Sept. 13, 1949 |